United States Patent Office 3,005,198
Patented Oct. 17, 1961

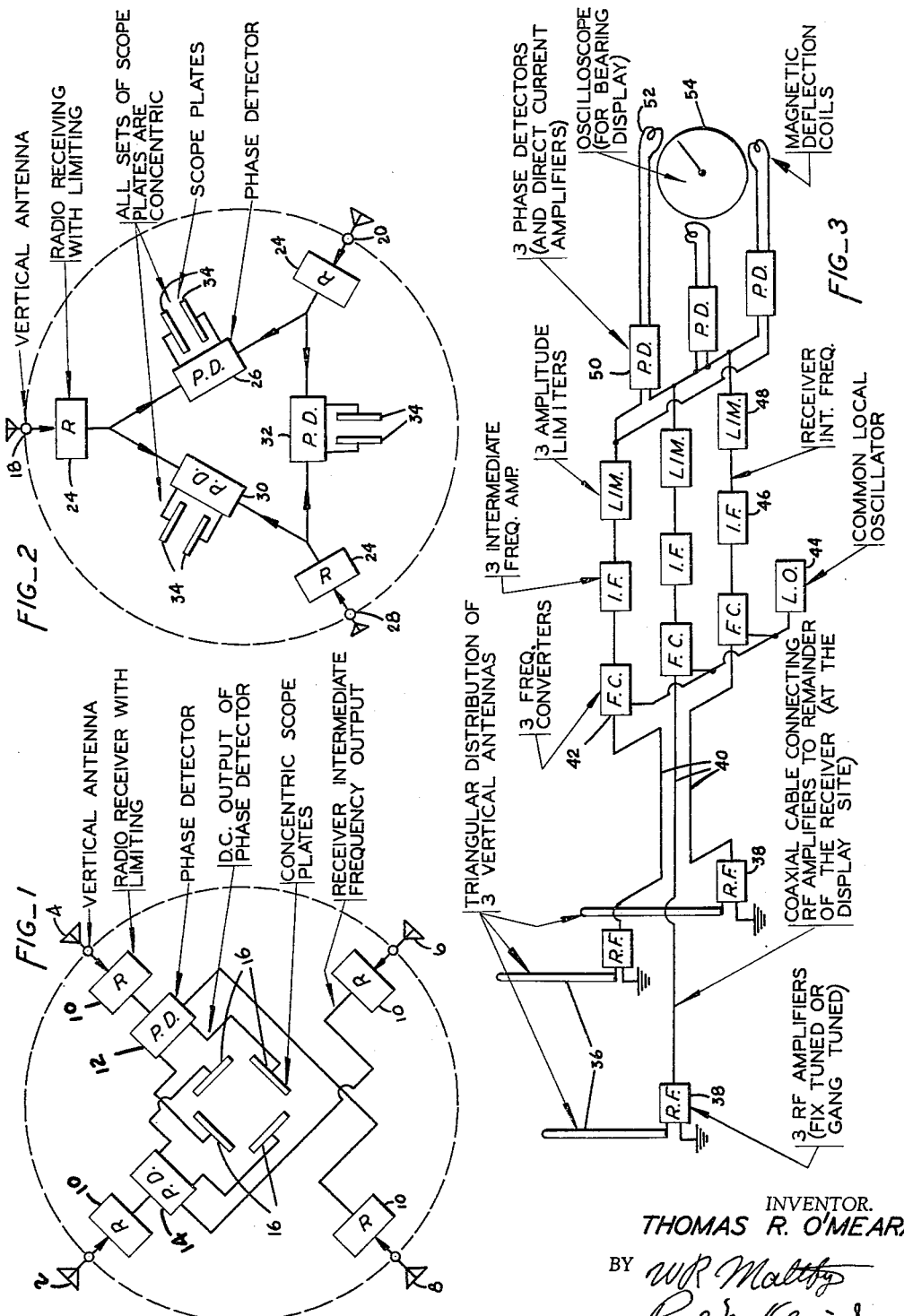

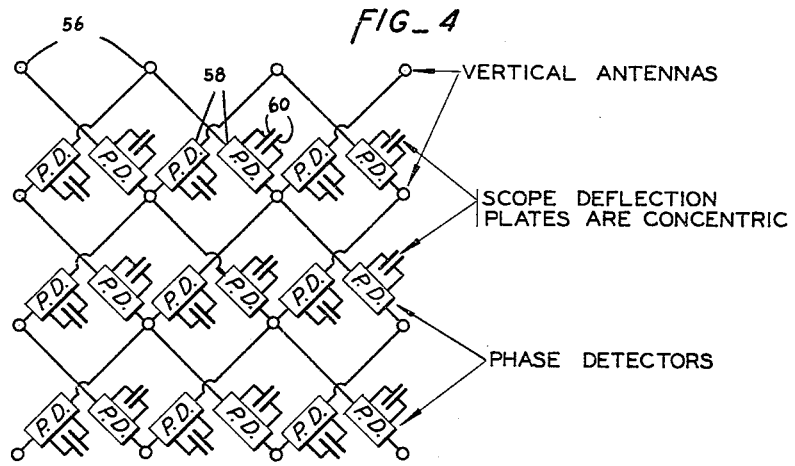
FIG_4
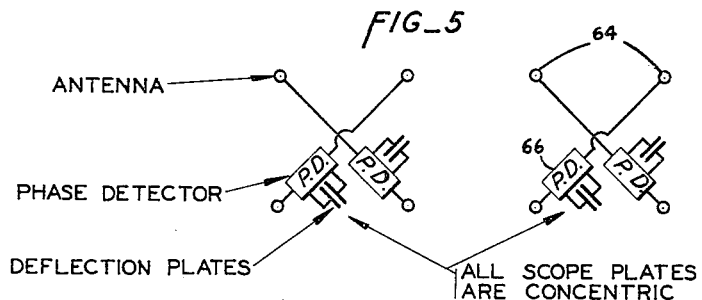
FIG_5
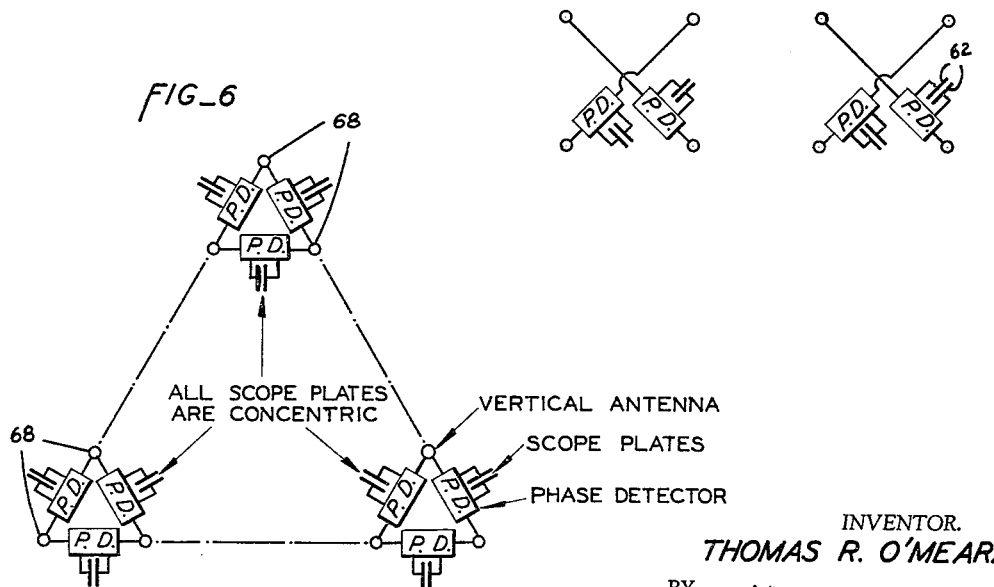
FIG_6
INVENTOR.
THOMAS R. O'MEARA

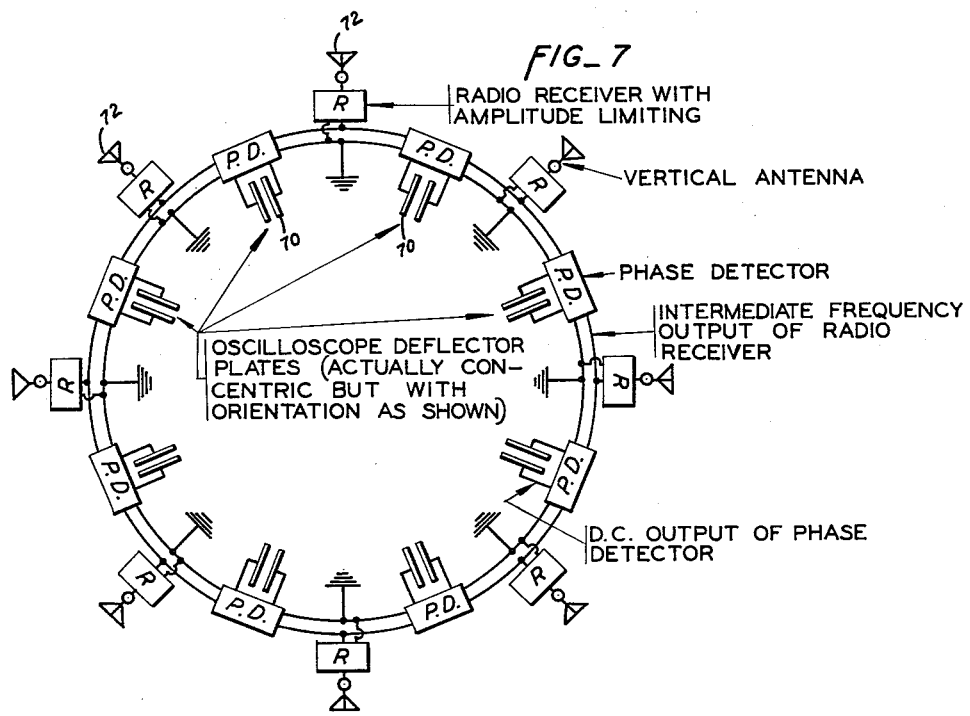
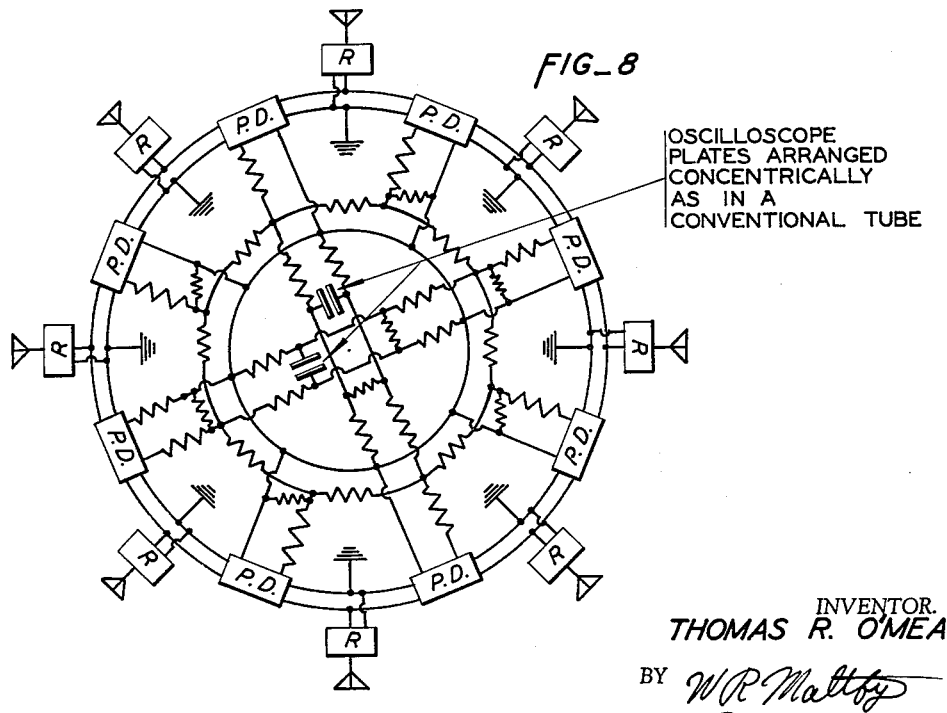

3,005,198
VECTOR-PHASE RADIO DIRECTION FINDER
Thomas R. O'Meara, Los Angeles, Calif., assignor, by mesne assignments, to the United States of America as represented by the Secretary of the Navy
Filed Aug. 6, 1957, Ser. No. 676,695
8 Claims. (Cl. 343—113)

This invention relates to radio direction finders and more particularly to vector-phase radio direction finders.

Prior art systems for accomplishing direction finding have been numerous. One of the better types of fast acting direction finders is the Watson-Watt or dual-channel type direction finder. Among the more advanced "wide-aperture" (large in wavelengths) direction finders are the Wullen-Webber and the Doppler systems. All of these prior art systems suffer from certain disadvantages. Watson-Watt or dual-channel systems are small in wavelengths and hence suffer greatly from wave interference errors. Under certain propagation conditions, with two signals arriving from nearly the same direction, the bearing errors can approach plus or minus 90°. The conventional Doppler system requires a mechanically rotating antenna and hence becomes impractical if the antenna size (determined by the received wavelength) is large. Switched Doppler systems require a switching of receivers from antenna to antenna and hence are extremely subject to switching transients. The switching rate is limited by receiver bandwidth, and the bearing presentation is relatively slow.

Wullen-Webber systems require the movement of some sort of rotary antenna coupling and hence the time required to rotate and take a bearing is much longer than with any of the other systems.

An object of the present invention is therefore to provide a radio direction finder system which will be fast acting and much less subject to wave-interference errors than prior art types of direction finders.

Other objects and many of the attendant advantages of the invention will be readily appreciated as the same becomes better understood by reference to the following detailed description when considered in connection with the accompanying drawings wherein:

FIG. 1 is a schematic diagram of one form of a four-element narrow diameter vector-phase system using an oscilloscope as a vector summing device;

FIG. 2 is a schematic diagram of a three-element vector-phase system being the simplest example of a class of continuous circular systems;

FIG. 3 is a somewhat more elaborate schematic showing of a three-element system such as in FIG. 2 with a modified form of vector summing device;

FIG. 4 is a schematic diagram of a continuous system made up of units similar to that of FIG. 1;

FIG. 5 is a schematic diagram of a distributed or discontinuous system made of units similar to FIG. 1;

FIG. 6 is a schematic diagram of a distributed system made up of units similar to FIG. 2;

FIG. 7 is a schematic diagram of a wide-aperture continuous circular system; and FIG. 8 is a schematic diagram illustrating the summing of vectors external to the bearing-indicating device.

The invention is constituted by a vector-phase system for combining the electrical information from a series of antennas (or direction finders) in such a way as to result in a composite direction finder much less subject to wave-interference errors than prior art types of direction finders. According to one aspect of the invention, this wave-interference error reduction comes about as a result of a space distribution over a region large in wavelengths (i.e. a "wide aperture" system) of the component antennas (or direction finders).

A vector-phase radio direction finder system is defined to be a direction finder which gives an indicated bearing resulting from the vector sum of two or more component vectors having the following characteristics. The magnitude is proportional to the phase difference (or some function of the phase difference) between the induced voltages in a pair of antennas of the system. The direction is determined by a convention applied to all pairs of antennas in the system and may be, for example, parallel to a line joining the two antennas of the pair (or may be normal to the line joining the two antennas), and the sense is in the direction-sense of the antenna whose induced voltage leads in phase. A vector-phase direction finder is of a type which falls in the general classification of phase front direction finders. A phase front direction finder is defined as being any system which, when small in aperture, tends to give a bearing normal to the curve of constant phase (in an electromagnetic field) passing through the center of the direction finder. Because of its relative simplicity, a vector-phase direction finder having a small diameter is described first, although the vector phase systems which offer substantial potential advances over prior art systems are those having large wavelength dimensions.

Reference is now made to the drawing. FIG. 1 shows a schematic diagram of one form of a four-element narrow diameter vector-phase system using an oscilloscope as a vector summing device constituting the means for indicating the bearing of a signal in response to the effects of the signal on the antennas and associated equipment of the system. Other vector-summing means can be used but an oscilloscope is typical. In FIG. 1 are shown four vertical antennas 2, 4, 6 and 8 distributed in a regular polygonal pattern. That is, antennas lie at the vertices of a regular polygon. They are thus evenly spaced around the circumference of a circle. Each antenna feeds into a radio receiver channel 10, preferably provided with limiting. Diagonally opposite antennas are shown as having the outputs of their receiver channels feeding into phase detectors 12 and 14. Each phase detector yields a direct voltage output which is proportional to the phase difference (or some function, such as the sine, of the phase difference) between the two signals fed into it. Thus the direct voltage output from phase detector 12, for example, is a measure of the phase difference between the signal received by antenna 4 and that received by antenna 8. The direct voltages emanating from the phase detectors are applied to concentric oscilloscope plates 16, the faces being (according to the convention here chosen) parallel to a line joining the center of the antenna elements whose phase is being compared. Although, for convenience in illustration and to show simply the relation between the position of the bearing indicator (the oscilloscope spot) and the geographical distribution of antennas, the scope plates are shown within the center of a circle passing through antennas, in practice, of course, the oscilloscope would be located in some area very likely remote from or indifferently placed relative to the location of the antennas. Since the force vectors causing the oscilloscope beam to deflect are proportional to the direct voltages on the plates, it is apparent that these force vectors will thus be proportional to the phase differences between the antennas. If this system has parameters and circuits such that its phase detectors operate substantially linearly, then the indicated bearing will be substantially that of the direction of arrival of a single signal.

Theoretically, in the simplest form, the direction finders of this invention, when using an oscilloscope as the bearing indicating means, require one pair of scope plates or a deflection coil for every pair of antennas used. For simplicity in illustration, most of the various embodiments will be shown as in FIG. 1 with an oscilloscope using deflection plates and with one pair of plates for each pair of antennas. However, it is to be understood that all of these embodiments can be realized in perhaps more practical designs where all of the electrical direct currents or voltages are added in an electrical circuit rather than adding the force components acting on an oscilloscope beam. This would reduce the oscilloscope requirements of the systems to an ordinary oscilloscope with two pairs of deflection plates (or two sets of deflection coils).

FIG. 2 shows another type of systems which utilizes only three antennas and is suitable for use as a narrow diameter system. This system is the simplest example of a class of continuous circular systems which are described hereinafter. In FIG. 2 the antennas 18 and 20 are connected together through their respective receiver channels 24 and with a phase detector 26 but each of these antennas is also connected to antenna 28 through phase detectors 30 and 32, respectively, so that the system can be described as continuous inasmuch as each antenna forms a pair with the other two antennas. In this embodiment, as is more usual, the convention chosen is that wherein the direction of the vector resulting from the induced voltages in a pair of antennas is parallel to a line joining these two antennas. Although, for the sake of avoiding confusion in the drawing, the scope plates 34 are shown as being displaced from one another, they are actually to be regarded as being concentric acting on a single beam. This technique of illustration is used in the other figures for convenience and illustration only. The orientation or direction of the plates is, always, shown correctly.

FIG. 3 shows a schematic diagram of an arrangement generally similar to that of FIG. 2 with magnetic deflection coils used as the summing device instead of deflection plates. Antennas 36 feed into RF amplifiers 38 which are fix-tuned or gang-tuned. The outputs of the RF amplifiers travel over coaxial cable 40 to the remainder of the receiver system which is located at the display site. The signal from the RF amplifiers goes through frequency converters 42, all of which are supplied with a common local oscillator voltage from a local oscillator 44. The output of the converters goes through intermediate frequency amplifiers 46, limiters 48, and phase detectors and D.C. amplifiers 50 corresponding to each pair of antennas. The outputs of the phase detectors are applied to deflection coils 52 on a conventional oscilloscope 54.

According to the invention the antennas of the systems are spaced so that the distance between the members of each pair of connected antennas is less than one half the wavelength of the received signal and the distance between the two most widely spaced antennas of the system is large in wavelengths of the received signal. Detailed descriptions of such systems are given hereinafter in reference to FIGS. 4 through 8.

In FIG. 4 is shown a lattice type of arrangement made up of a group of small-diameter units similar to the system of FIG. 1 with all the various units interconnected as known. This type of interconnection is known as a continuous system. In FIG. 4 each antenna 56 is actually provided with a receiver having amplitude limiting, although for schematic simplicity these receivers are not shown. The receivers feed into the phase detectors 58 and thence to oscilloscope plates 60, all of which, again, are actually made to act uniformly on a single beam in a cathode ray tube but, again for simplicity, are shown oriented correctly but being displaced in the drawing.

The system of FIG. 4 can be rendered far more economical of receivers and antennas if some of the control antennas and receivers are omitted as in FIG. 5. The arrangement in FIG. 5 is called a distributed system or discontinuous system. Again, all the vector-summing scope plates 62 are actually concentric, acting on a single beam, although they are shown in the figure in the position most convenient for illustration, maintaining their correct orientation. Each antenna 64 in the distributed system is paired with only one other antenna to a phase detector 66 instead of serving as one of the antennas of several pairs. In a continuous system, as evident from FIG. 4, the phase between every pair of diagonally opposite antennas is compared, whereas, in a distributed system made up of a group of more or less separate "unit" systems, there is no phase comparison between any antennas of one unit system and those of another.

Another example of a distributed system, a triangular system, is shown in FIG. 6 where the same symbolic representation is used as in FIGS. 4 and 5 but wherein the unit systems are the same as in FIG. 2. Each unit system is made up of three antennas 68 at the vertices of an equilateral triangle and the centers of each of the three unit systems lie at the vertices of a larger equilateral triangle.

Another example of a continuous system is the circular system shown in FIG. 7 which is one of the most practical of the large diameter continuous systems. Again, the multiple sets of oscilloscope plates 70 are actually arranged to form a vector-summing device acting on a single oscilloscope beam but oriented as shown in the drawing. As in all the other systems, the antennas 72 of this system lie at all the vertices of a regular polygon although the impression of the assembly is circular at first glance.

Although the specialized scope tube with multiple sets of plates can be used, as indicated in the embodiments of most of the preceding figures, there is no need to use such a specialized tube. With proper circuits it is possible to duplicate the action of any of these multiple deflection tubes with a common four-plate tube possessing a single pair of vertical and a single pair of horizontal deflection plates. As the angle of any electric force vector in a multiple plate tube is known in advance for a given type system, the vertical and horizontal components of this vector are known and the vector can be duplicated in its action by applying these vertical and horizontal components to the vertical and horizontal deflection plates of a conventional tube. If this procedure is carried out for all vectors, the horizontal and vertical components of the vectors can be summed external to the scope and only one horizontal and one vertical need be summed in the scope.

An examination of the eight-pair vector summing scope shown in FIG. 7 used, by way of example only, with an eight-element continuous circular system shows that all vectors are at angles which are multiples of 45° to the reference axis. The voltages corresponding to vectors at angles of 10° and 90° can be applied to the vertical and horizontal plates of a two-pair scope tube, while the voltages corresponding to vectors at ±45° to the reference axis can have $$\frac{1}{\sqrt{2}}$$

times their magnitude applied (in the correct polarity) to both the vertical and horizontal plates of the two-pair tube. A resistor ring network for applying these voltages to a two-pair tube is shown in FIG. 8 together with the eight-element circular continuous system to which it is applicable.

With similar techniques the action of any vector summing tube can be duplicated with a conventional oscilloscope tube. The device for obtaining the sine and cosine components of the vectors and summing them need not necessarily be resistor ring networks. It is sometimes preferable for greater accuracy to use vacuum tube circuits.

If the two resultant voltages representing the sine and cosine vector components were applied directly to the vertical and horizontal deflection plates, the beam spot would deflect to the correct angular position corresponding to the azimuth of the arriving signal. However, a more readable bearing results if the direct voltages are converted to co-phasal alternating voltages which are applied to the oscilloscope plates to produce a radial-line type of bearing indication.

It should be noted that in all of the systems embraced in this invention the antennas are distributed in a regular polygonal array. That is, the antennas of each unit system lie at the vertices of a regular polygon and the centers of the unit systems lie at the vertices of a regular polygon. All of the systems of the present invention have the advantage over prior art wide-aperture systems of being relatively faster in their operation. Although a relatively large number of receivers is required, an increase in reliability results and, furthermore, these systems can function fairly accurately with one or more receivers dead if the total number of receivers is large.

Obviously many modifications and variations of the present invention are possible in the light of the above teachings. It is therefore to be understood that within the scope of the appended claims, the invention may be practiced otherwise than as specifically described.

What is claimed is:

1. A vector-phase radio direction finder system comprising a plurality of antennas disposed in a regular polygonal array, a radio receiver channel for each antenna; said antennas being associated in pairs; a phase detector for each said pair of antennas connected to receive the output from the radio receiver channels for its pair of antennas and to produce a direct current output whose magnitude is a function of the phase difference between the radio frequency signals received by said pair of antennas; means for indicating the bearing relative to the center of said antenna array of a source of signals received by said antennas; and means responsive simultaneously to the outputs of all of said phase detectors for positioning said indicating means, said phase detector output responsive means being oriented and connected so that the effect, on the positioning of said indicating means, of the signals from each said pair of antennas bears the same corresponding relation to the direction of a line extending through the two antennas of each respective said pair; the distance between the most widely spaced of the antennas of said system being large compared to the wavelength of the signals being received.

2. The system of claim 1 wherein the distance between adjacent associated antennas is less than ½ the wavelength of the received signal.

3. The system of claim 2 wherein all of said antennas lie on the circumference of a circle.

4. The system of claim 3 wherein each antenna is simultaneously paired with an antenna displaced clockwise from it and also with another antenna displaced counterclockwise from it.

5. The system of claim 4 wherein said indicating means includes a cathode ray oscilloscope.

6. The system of claim 5 wherein said cathode ray oscilloscope comprises two pairs of mutually perpendicular plates and wherein the outputs of said phase detectors are electrically combined in a network and thereafter applied to said two pairs of oscilloscope plates, whereby only two pairs of plates are required in said oscilloscope.

7. The system of claim 2 wherein said antennas are connected in a continuous pattern.

8. The system of claim 2 wherein said antennas are connected in a distributed pattern.

References Cited in the file of this patent

UNITED STATES PATENTS

| | | |
|---|---|---|
| 2,437,695 | Jansky | Mar. 16, 1948 |
| 2,808,583 | Mathes | Oct. 1, 1957 |